(12) United States Patent
Kurtz et al.

(10) Patent No.: US 10,324,122 B2
(45) Date of Patent: Jun. 18, 2019

(54) PREDICTING NOISE PROPAGATION IN CIRCUITS

(71) Applicant: International Business Machines Corporation, Armonk, NY (US)

(72) Inventors: Steven Kurtz, Austin, TX (US); Ronald D. Rose, Essex Junction, VT (US); Sanjay Upreti, Lexington, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 420 days.

(21) Appl. No.: 14/967,442

(22) Filed: Dec. 14, 2015

(65) Prior Publication Data

US 2017/0168105 A1 Jun. 15, 2017

(51) Int. Cl.
*G01R 29/26* (2006.01)

(52) U.S. Cl.
CPC .................................. *G01R 29/26* (2013.01)

(58) Field of Classification Search
CPC ....................................................... G01R 29/26
USPC ............................................................ 702/69
See application file for complete search history.

(56) References Cited

U.S. PATENT DOCUMENTS

| | | | |
|---|---|---|---|
| 6,732,339 B2 | 5/2004 | Savithri et al. | |
| 7,219,046 B2 | 5/2007 | Chen et al. | |
| 7,346,867 B2 | 3/2008 | Su et al. | |
| 7,761,275 B2 | 7/2010 | Chopra et al. | |
| 7,941,775 B2 | 5/2011 | Abbaspour et al. | |
| 8,438,001 B2 | 5/2013 | Natarajan et al. | |
| 8,516,420 B1 * | 8/2013 | Kariat ................. | G06F 17/5036 703/14 |
| 8,543,954 B1 * | 9/2013 | Keller ................. | G06F 17/5031 703/14 |
| 8,595,669 B1 * | 11/2013 | Keller ................. | G06F 17/5036 716/106 |
| 8,707,234 B1 | 4/2014 | Ye et al. | |
| 8,966,421 B1 | 2/2015 | Kariat et al. | |
| 2003/0079191 A1 | 4/2003 | Savithri et al. | |
| 2006/0069537 A1 * | 3/2006 | Cao ..................... | G06F 17/5036 703/14 |

OTHER PUBLICATIONS

I. Keller, et al.,"A Robust Cell-level Crosstalk Delay Change analysis", IEEE/ACM International Conference on Computer Aided Design, 2004, pp. 1-25.

(Continued)

*Primary Examiner* — Ricky Ngon
(74) *Attorney, Agent, or Firm* — Cantor Colburn LLP; Steven Meyers

(57) ABSTRACT

A method for predicting noise propagation in a circuit comprising correlating noise results predicted by a circuit model to a transistor level model with a processor, generating a first best fit data analytics model for identifying the optimal output pin capacitance as a function of circuit conditions and store the first best fit model in a noise rule file in a memory, generating a second best fit data analytics model for predicting noise peak output from the circuit model as a function of the circuit conditions and store the second best fit model in the noise rule file in the memory, and applying the first best fit model and the second best fit model in a noise analysis simulation to identify and simulate an optimal circuit.

17 Claims, 7 Drawing Sheets

(56) References Cited

OTHER PUBLICATIONS

R. Goyal et al., "Current Based Delay Models: A Must for Nanometer Timing", Candence Design System, Inc., pp. 1-8.
Anonymous, Method and Apparatus for Non-simulation Based Estimation of Input Pin Capacitance of Hard IPs, IP.com, No. IPCOM00022850D, Oct. 25, 2012. 6 pages.
CCS Timing, Technical White Paper, Version 2.0, Synopsys, Inc, Dec. 20, 2006. 15 pages.
Choi, S.H., Somasekhar, D., & Roy, K. (2002). "Dynamic noise model and its application to high speed circuit design," Microelectronics journal, 33(10), 835-846. doi:10.1016/S0026-2692(02)00094-0.
Fatemi, et al., "Statistical logic cell delay analysis using a current-based model," M. Design Automation Conference, 2006 43rd ACM/IEEE, 2006. 4 pages.
Kaur et al., "An Accurate Current Source Model for CMOS Based Combinational Logic Cell," 13th International Symposium on Quality Electronic Design, 2012. 5 pages.
Oh, et al., "How to use Composite Current Source Modeling for Crosstalk Noise Analysis," Synopsys, Inc., Embedded Online Publication, Mar. 9, 2007. 4 pages.
Peng Li; Acar, E., "A Waveform Independent Gate Model for Accurate Timing Analysis," Computer Design: VLSI in Computers and Processors, 2005. ICCD 2005. Proceedings. 2005 IEEE International Conference on Computer Design, Year: 2005. 3 pages.

\* cited by examiner

PREDICTING NOISE PROPAGATION IN CIRCUITS

BACKGROUND

The present invention generally relates to integrated circuit design, and more specifically, to predicting noise propagation in circuits.

In the integrated circuit design process, computer programs are often used to verify the integrity of circuit designs and predict the behavior of the circuits.

An industry standard program for circuit design analysis is the simulation program with integrated circuit emphasis (SPICE). The SPICE program may use composite current source (CCS) models for noise rules to determine gate level noise characterizations.

The CCS models for noise rules (CCS-Noise) provides an input/output voltage dependent driver model (a ViVo table) for the gate. The ViVo (voltage in/voltage out) table is a two-dimensional table of currents characterized for a range of input and output voltages.

SUMMARY

According to an embodiment of the present invention, a method for predicting noise propagation in a circuit comprising correlating noise results predicted by a circuit model to a transistor level model with a processor, generating a first best fit data analytics model for identifying the optimal output pin capacitance as a function of circuit conditions and store the first best fit model in a noise rule file in a memory, generating a second best fit data analytics model for predicting noise peak output from the circuit model as a function of the circuit conditions and store the second best fit model in the noise rule file in the memory, and applying the first best fit model and the second best fit model in a noise analysis simulation to identify and simulate an optimal circuit.

According to another embodiment of the present invention, a system comprises a memory, and a processor communicatively connected to the memory, the processor operative to correlate noise results predicted by a circuit model to a transistor level model with a processor, generate a first best fit data analytics model for identifying the optimal output pin capacitance as a function of circuit conditions and store the first best fit model in a noise rule file in a memory, generate a second best fit data analytics model for predicting noise peak output from the circuit model as a function of the circuit conditions and store the second best fit model in the noise rule file in the memory, and apply the first best fit model and the second best fit model in a noise analysis simulation to identify and simulate an optimal circuit.

According to yet another embodiment of the present invention, a computer program product comprising a computer readable storage medium having program instructions embodied therewith, the program instructions executable by a processor to cause the processor to perform a method comprises correlating noise results predicted by a circuit model to a transistor level model with a processor, generating a first best fit data analytics model for identifying the optimal output pin capacitance as a function of circuit conditions and store the first best fit model in a noise rule file in a memory, generating a second best fit data analytics model for predicting noise peak output from the circuit model as a function of the circuit conditions and store the second best fit model in the noise rule file in the memory, and applying the first best fit model and the second best fit model in a noise analysis simulation to identify and simulate an optimal circuit.

DETAILED DESCRIPTION

The methods and systems described herein provide an improved method for analyzing noise in integrated circuit designs.

Figure 1:
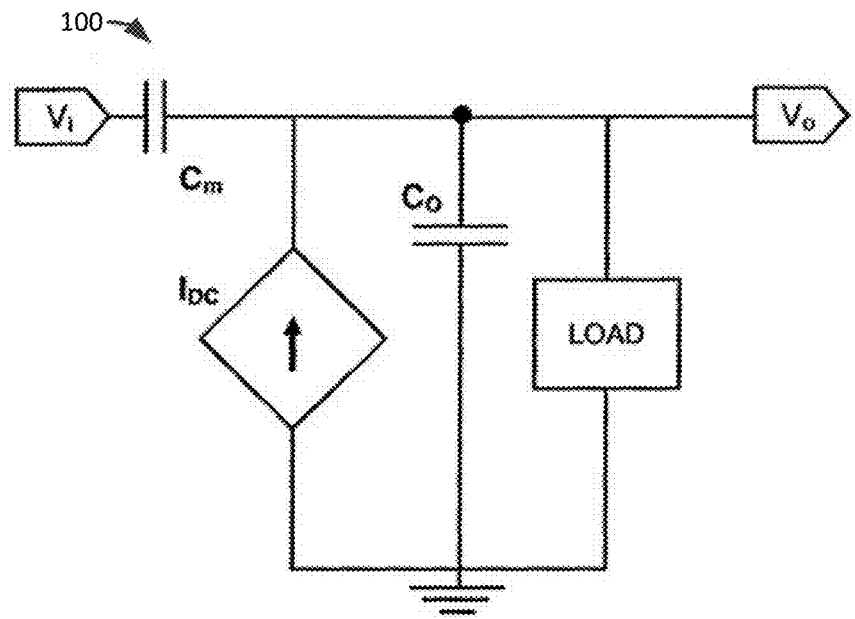
FIG. 1 illustrates an example of a current source model circuit where Co is the output capacitance of the circuit.

In this regard, the CC S-Noise approach using ViVo tables as discussed above has a number of weaknesses. The previous approaches do not model the intrinsic cell capacitance at the output of the cell. The output capacitance of complimentary metal oxide semiconductor (CMOS) devices is voltage dependent, and a single point measurement does not accurately represent the capacitance characteristics of the device, and has limited use for gates with more than two stages of logic. FIG. 1 illustrates an example of a current source model circuit 100 where $C_o$ is the output capacitance of the circuit 100.

Though previous CCS-Noise rules include propagated noise tables, the noise tables are sparsely sampled, and thus, provide limited accuracy. For example, typical CCS-Noise propagation tables sample the input noise pulse at 3 to 5 different amplitudes and a few output load conditions. Since the gate characteristics are typically non-linear, the tables cannot be used for analyzing arbitrary noise pulses without a significant accuracy loss.

Figure 2:
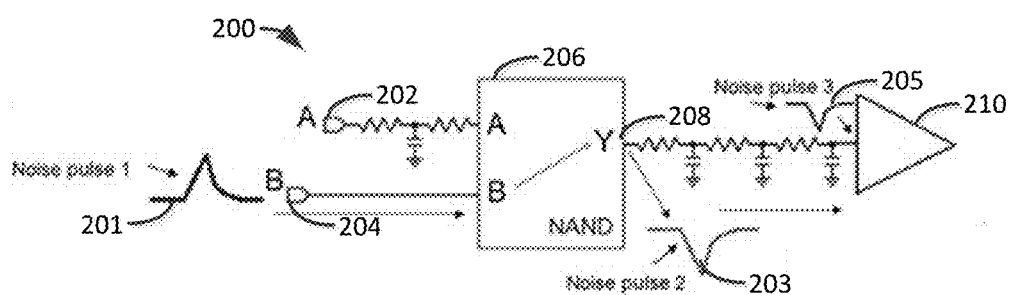
FIG. 2 illustrates an example of a noise pulse propagation in a circuit.

FIG. 2 illustrates an example of a noise pulse propagation in a circuit 200. The circuit 200 includes a cell 206 that has an input pin A 202 and an input pin B 204. A noise pulse 201 is induced in the cell at input pin B 204. Using a current source model the output noise pulse 203 may be calculated. The output noise pulse 203 is the noise pulse that results from the input noise pulse 201 propagating through the cell 206. The resulting noise pulse 203 that is output from the output pin Y 208 travels to the input of the sink 210 as noise pulse 205. The signal path described above represents a first input-to-output arc (arc). A second signal path or arc is defined by the input at the input pin A 202, the cell 206, and the output pin Y 208. Each arc has two when conditions. The when conditions for the first arc is when A=0 and when A=1. The when conditions for the second arc is when B=0 and when B=1. To fully analyze the noise pulse propagation of the circuit 200, each of the arcs and their when conditions are analyzed.

Figure 3:
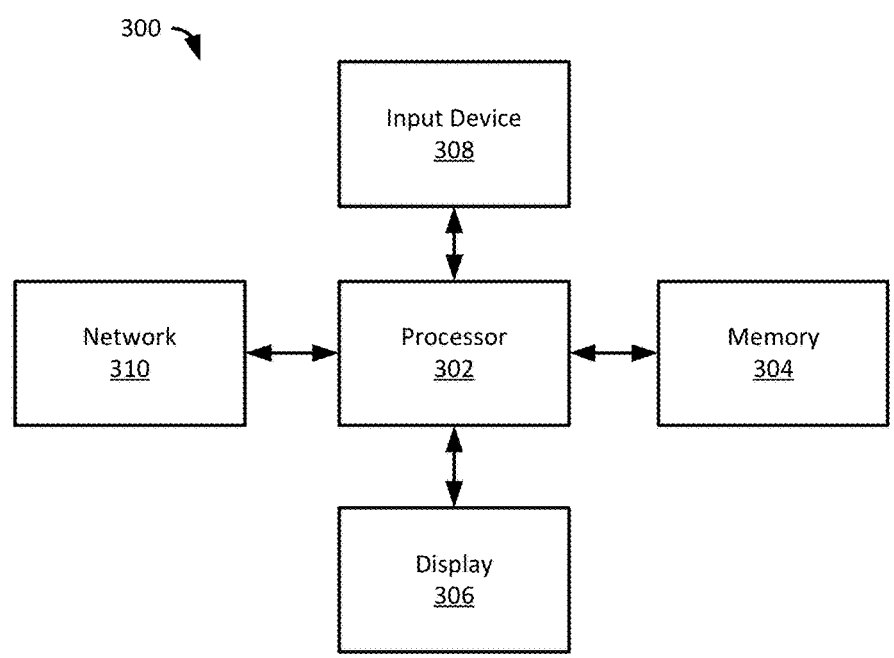
FIG. 3 illustrates a block diagram of an exemplary embodiment of a processing system.

FIG. 3 illustrates a block diagram of an exemplary embodiment of a processing system 300. The processing system 300 includes a processor 302 that is communicatively connected to a memory 304, a display 306, an input device 308, and a network 310. The processing system 300 is operative to perform the methods described herein.

Figure 4:
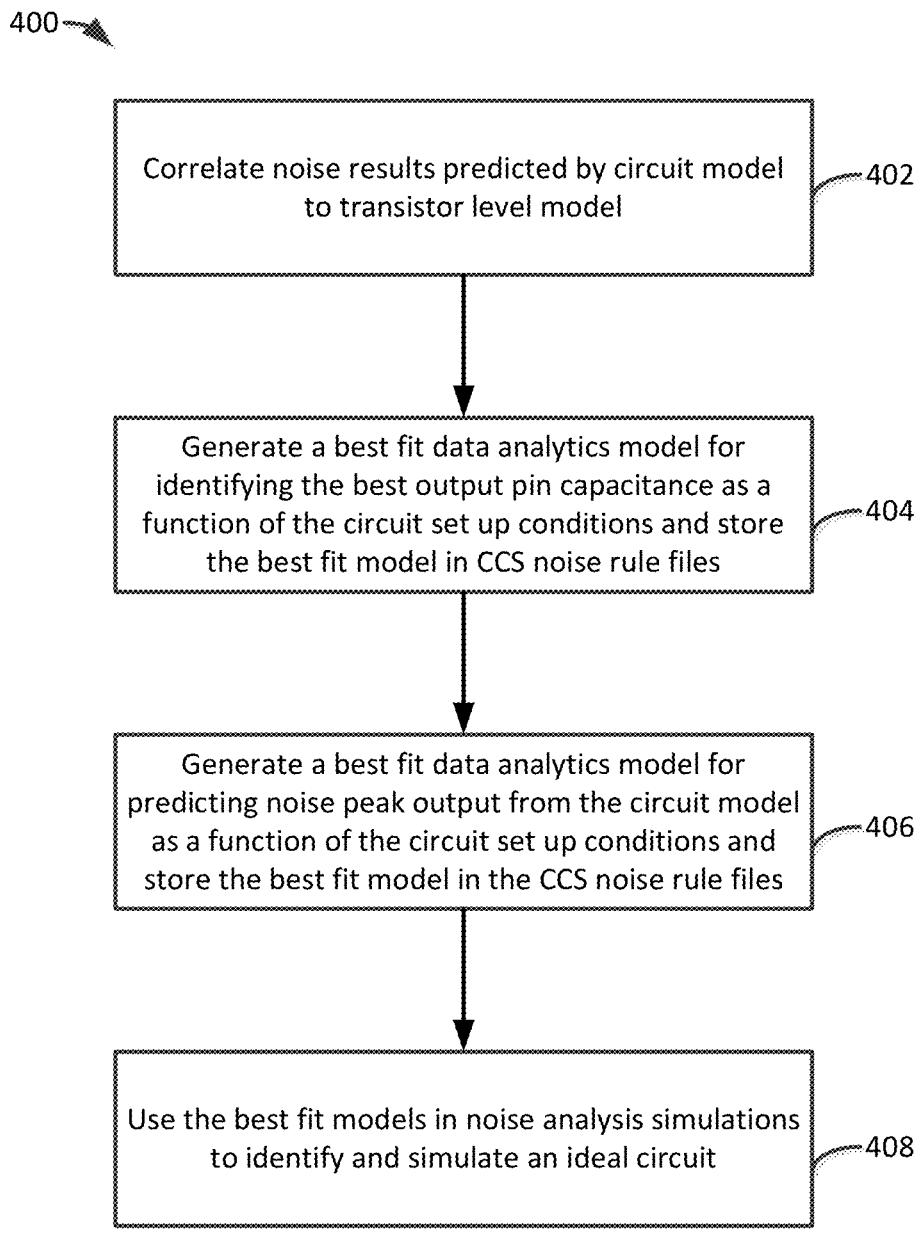
FIG. 4 illustrates an exemplary method for identifying and simulating an ideal circuit that may be performed by the system of FIG. 3.

FIG. 4 illustrates an exemplary method 400 for identifying and simulating an ideal circuit that may be performed by the system 300 (of FIG. 3). In this regard, in block 402, noise results predicted by a circuit model are correlated to a transistor level model. In block 404, a best fit data analytics model for identifying the best output pin capacitance as a function of the circuit set up conditions is generated and stored in CCS noise rule files. The best fit model guides the setup of ViVo simulations yielding results that correlate more strongly with SPICE simulations than ViVo simulations that use a default pin capacitance value. In block 406, a best fit data analytics model for predicting noise peak output from the circuit model as a function of the circuit set up conditions is generated and stored in the CCS noise rule files. This model guides the selection of the proper "when" condition for a particular circuit to yield the desired result (i.e., the most pessimistic when condition). In block 408 the best fit models are used in noise analysis simulations to identify and simulate an ideal circuit. The results of the noise analysis simulations are output to a user on the display 306.

The details of each of the blocks in the method 400 will be described in further detail below.

Figure 5:
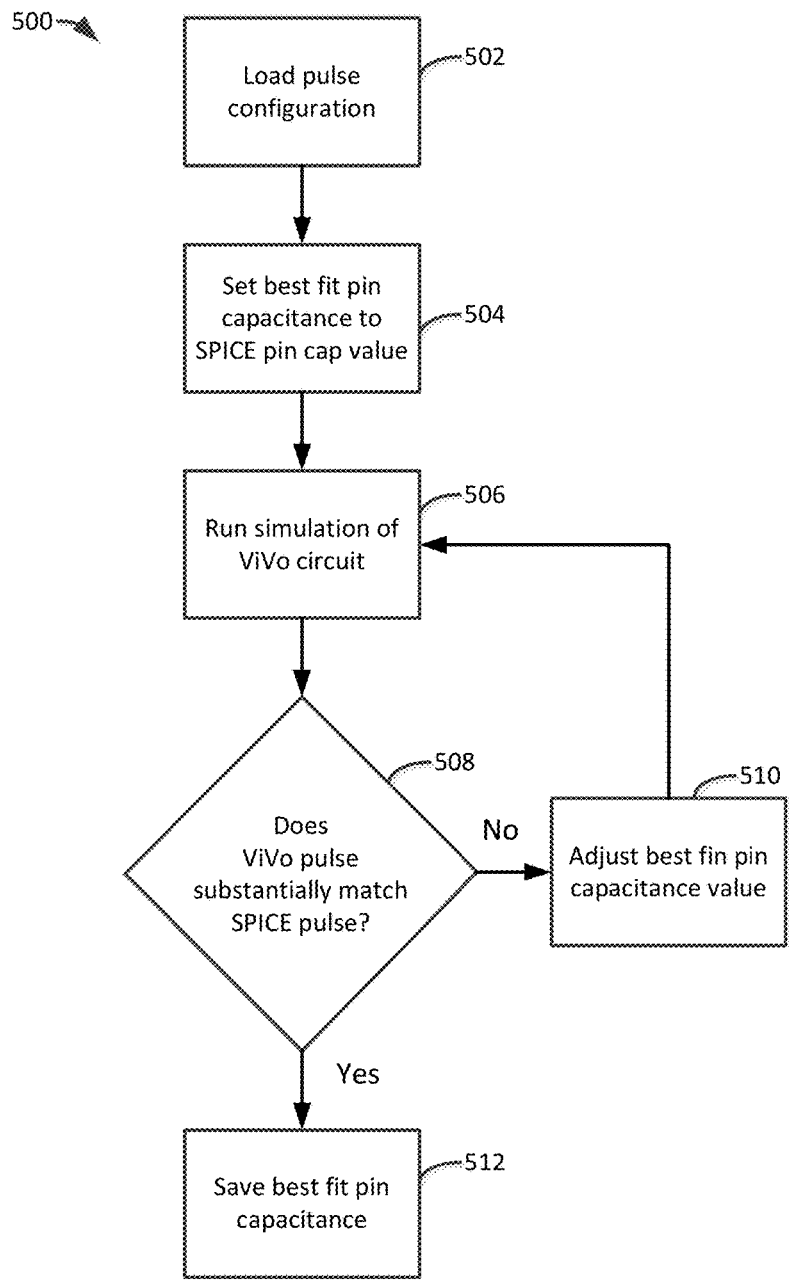
FIG. 5 illustrates a block diagram of further details of the method of FIG. 4.

FIG. 5 illustrates a block diagram of a method 500 that is briefly described above in block 402 (of FIG. 4). In this regard, in block 502, the pulse configuration is received (loaded) by the processor 302 (of FIG. 3). The pulse configuration includes the circuit ViVo model, and expected output values. In block 504, the best fit pin capacitance to SPICE pin capacitance values are set. The ideal fit parameters improve the relative speed and accuracy with which the best fit values are identified. The ideal fit parameters include absolute voltage tolerance, relative voltage tolerance, minimum pin capacitance tolerance, and the maximum number of iterations. Absolute voltage tolerance is the minimum peak voltage difference between ViVo simulations and transistor level SPICE simulations. Relative voltage tolerance is the maximum peak voltage difference (as a percentage of the expected peak voltage) between the ViVo simulations and transistor level SPICE simulations. Minimum pin capacitance tolerance ensures that the selected pin capacitance is within a certain range of the smallest possible pin capacitance value satisfying the voltage matching criteria. The minimum pin capacitance tolerance prevents undesirably large pin capacitance values from being selected. The maximum number of iterations is the maximum number of pin capacitance values that are tested before accepting that the requested voltage tolerance metrics may not be able to be satisfied.

In block 506, the SPICE or Power Maise simulation is run on the ViVo circuit. In block 508 the processor 302 (of FIG. 3) determines whether resultant the ViVo pulse substantially matches the SPICE pulse. If the result passes the best fit pin capacitance is output. If the result does not pass, the best fit pin capacitance value is adjusted and the simulation is run again in block 506. In the exemplary embodiment the criteria that may be used to determine whether an acceptable pin capacitance value has been found is generally aimed at finding the smallest output capacitance ($C_o$) that will fall within a provided voltage tolerance. In one exemplary embodiment, the verification criteria is defined such that either [(A) and (B)] or (C) is true. Where for (A) the output voltage peak is within the minimum voltage tolerance of the target voltage, and for (B) the output pin capacitance is within the minimum pin capacitance tolerance. Where for (C) the maximum number of iterations has been exceeded.

Regarding block 404 (of FIG. 4) the best fit data analytics model is generated for identifying the best output pin capacitance as a function of the circuit set up conditions. In this regard, previous CCS models for a gate only provide a fixed pin capacitance for a specific slew. However, to match the propagated noise pulse using the ViVo models of CCS-Noise rules with the corresponding SPICE output (using original transistor based models) the pin capacitance depends on various intrinsic and external characteristics of the gate as well as the shape of the input pulse. In general, the input pulse width, amplitude, and the gate-output load are the three major control parameters to accurately model pin capacitance. The dependence on the input pulse characteristics lessens the accuracy of the industry standard for the pin capacitance data in the CCS-Noise rules when high accuracy with respect to the SPICE simulations is desired.

To overcome the issue described above, in block 404 a prediction model based on an analytic study of a large number of SPICE simulations for pin capacitance values that generates a functional form for the pin capacitance dependent on input pulse parameters and output load is created. In this regard, a model fitting algorithm is used to fin pin capacitance data in a four dimensional hypersurface. In the illustrated exemplary embodiment, a Chi-Square minimization algorithm is used where:

$$\frac{\delta}{\delta C_{\alpha\beta\gamma}} \sum_k \left( f_k \left( C_{\alpha\beta\gamma} x_k^\alpha y_k^\beta z_k^\gamma \right) \right)^2 = 0,$$

and $x$ = amplitude, $y$ = width, and $z$ = load

Figure 6:
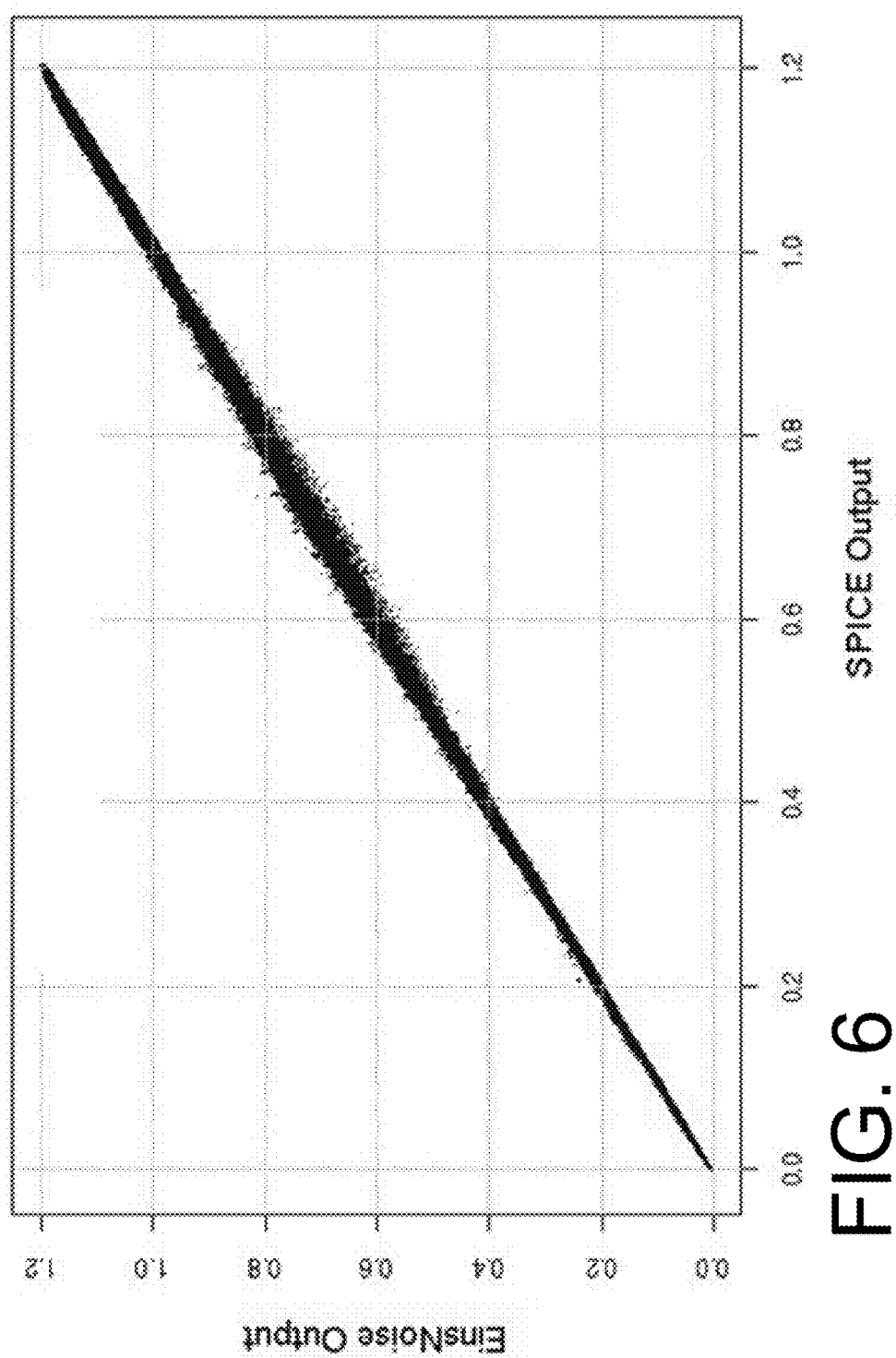
FIG. 6 illustrates the results of the prediction model described above, which used over five million different input pulse and load characteristics.

FIG. 6 illustrates the results of the prediction model described above, which used over five million different input pulse and load characteristics. The distribution shows that the model predicts the pin capacitance within a few percentage points of the SPICE model simulations, and thus, provides for accurate noise propagation analysis.

A weakness of using previous ViVo models from CCS-noise rules for gate level noise propagation is when selecting a proper equivalence class or "when" condition for a given arc (cell input-output path). In gate level static noise analysis there is often insufficient logic information available regarding other inputs to the gate so all of the "when" conditions are simulated to ensure the worst case scenario has been addressed. This may significantly slow propagation computations.

To address the weakness described above, a fast model is used to predict a propagated noise amplitude for every when condition for every arc in the circuit using the ViVo model. In the illustrated exemplary embodiment, millions of noise propagation simulations are performed to generate the prediction model. The prediction model depends on the input pulse characteristics and the output load. The prediction model is used to choose the "worst" arc for noise propagation, which is used in a subsequent full-waveform analysis.

By identifying the "worst" arc for noise propagation, exhaustive full simulations of every arc may be avoided.

Figure 7:
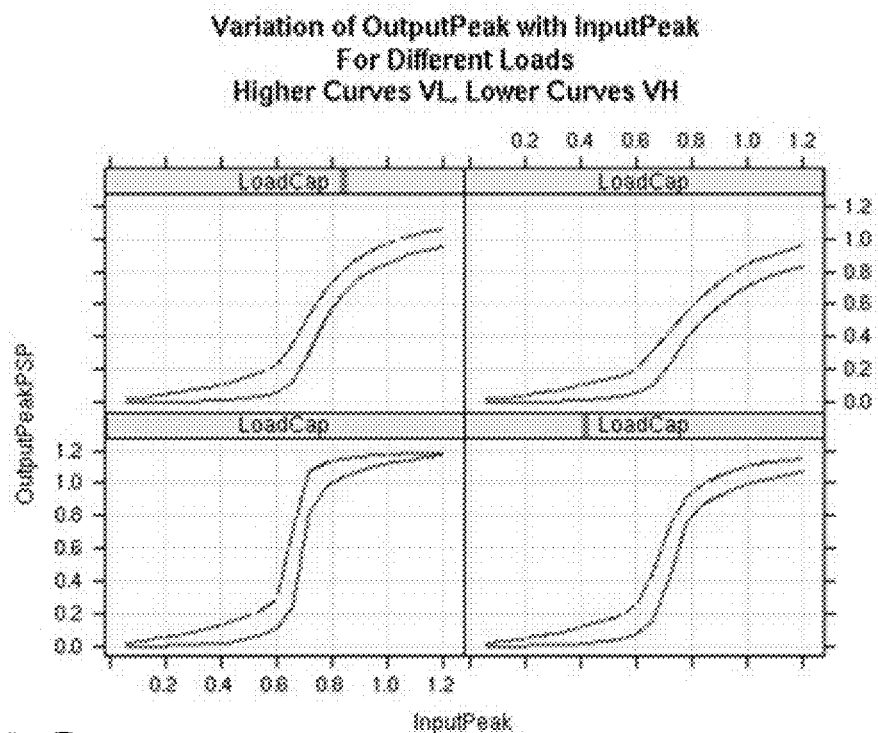
FIG. 7 illustrates the variation of the output noise amplitude with respect to input noise pulse characteristics (the input peak) with respect to output load.
Figure 8:
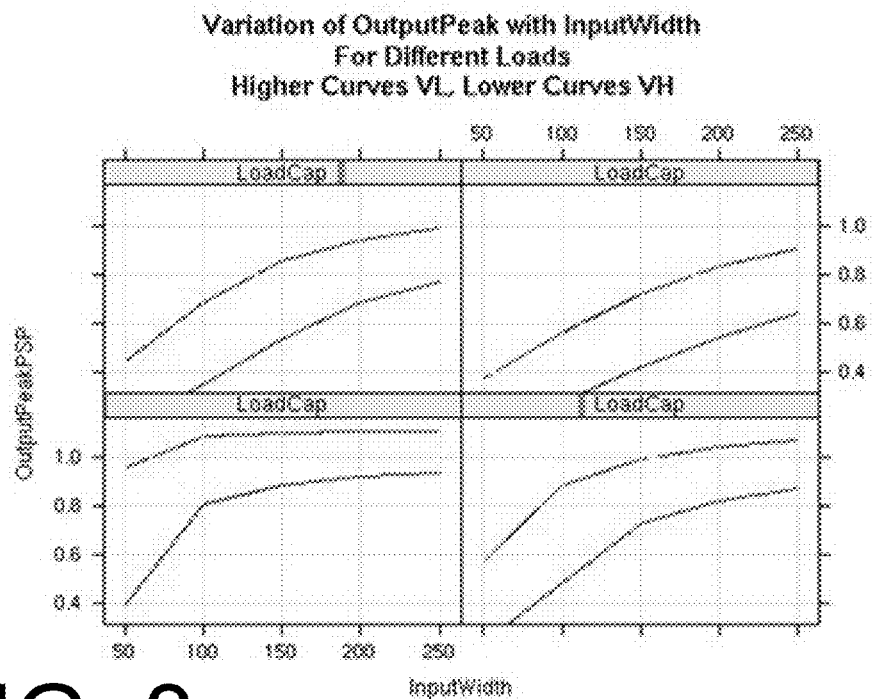
FIG. 8 illustrates the variation of the output noise amplitude with respect to input noise pulse characteristics (the input width) with respect to output load.

FIG. 7 illustrates the variation of the output noise amplitude with respect to input noise pulse characteristics (the input peak) with respect to output load. FIG. 8 illustrates the variation of the output noise amplitude with respect to input noise pulse characteristics (the input width) with respect to output load.

Based on the variation of the output noise amplitude with respect to the input noise pulse characteristics and the output load a variation model is devised. In one exemplary embodiment, a Sigmoid Model is used to model the input amplitude parameter where:

$$\frac{1}{1+\alpha e^{-\beta x}}$$

The model above may be simplified as a polynomial in the inverse logarithmic scale. The variation with respect to the input width and the output load may be treated as linear polynomial models such as second and third order polynomials.

Based on this model, the output pulse amplitude for a given arc for a given "when" condition may be predicted to a high confidence level without running an actual SPICE simulation. This reduces run-time significantly.

Figure 9:
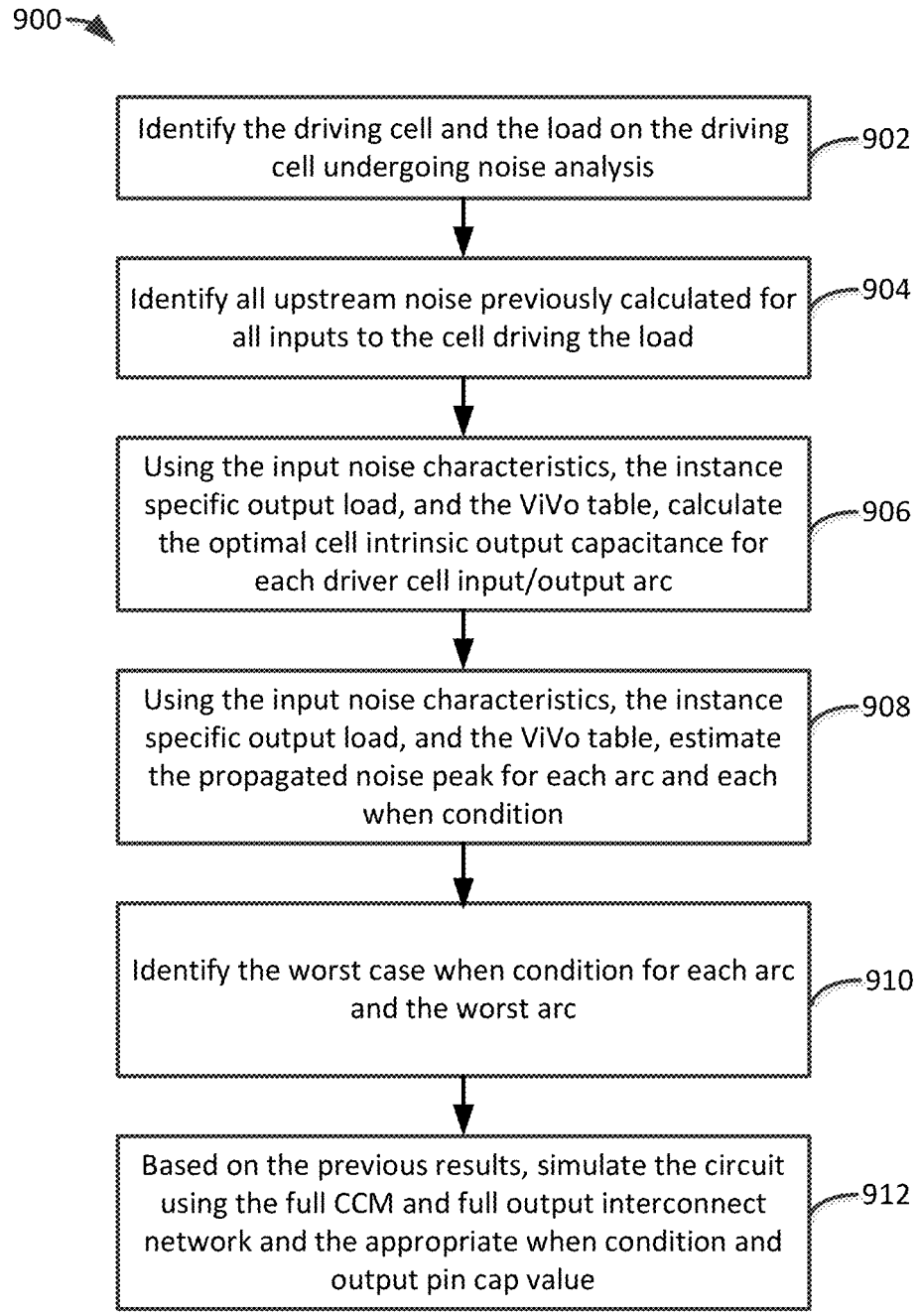
FIG. 9 illustrates a block diagram of an exemplary method for using the best fit models in noise analysis simulations to identify and simulate an ideal circuit.

FIG. 9 illustrates a block diagram of an exemplary method for using the best fit models in noise analysis simulations to identify and simulate an ideal circuit described above in block 408 (of FIG. 4). In this regard, referring to FIG. 9, the method 900 identifies the noise cluster comprising the driving cell of the net and the complete parasitic network of the net including coupled nets for each net in the design. A net is a conductor or wire that interconnects two or more component terminals. A net can be also be defined as a logical representation of a physical wire in the chip design. In block 902, the processor 302 (of FIG. 3) identifies the driving cell and the load of the driving cell undergoing noise analysis. In block 904, the processor 302 identifies all upstream noise previously calculated for all inputs to the cell driving the load. Using the input noise pulse characteristics, the instance specific output load and the ViVo table, the processor 302 calculates the optimal cell intrinsic output capacitance for the arc for each driver cell input/output arc in block 906. In block 908, using the input noise pulse characteristics, the instance specific output load and the ViVo table, the processor 302 estimates the propagated noise peak for each arc and each when condition. In block 910 the processor 302 identifies the worst case condition for each arc and the worst arc, which is determined by the amount of noise propagated through each arc. The processor 302 predicts if the propagated noise pulse is significant and needs a more accurate analysis. This evaluation could be performed in a variety of ways. In an exemplary embodiment, a strict threshold (for instance, all noise pulse amplitudes below this threshold can be ignored as they will not interfere with the intended function of the chip.) Other exemplary methods may be used to predict the need for more accurate analysis, for example, looking at the noise slack—the amount of additional noise needed to cause a functional failure in sink circuits. The processor 302 also predicts if there may be a failure due to noise at this point in the circuit design. Static noise analysis looks at one net or wire at a time, and evaluates if noise on that wire could cause downstream circuits to switch when they are not intended to switch. This sink point is the "point" in the design. There are also different phases of a design cycle, where they are making changes which could add or decrease noise. In block 912, the processor 302, determines, based on the previous results, whether to simulate the circuit using the full current source model and full output interconnect network, the appropriate when condition, and output pin capacitance value. This would capture the entire propagated noise pulse waveform shape, without performing a costly full simulation of every arc and every when condition of every arc.

The method described herein may be used in a large static noise analysis, which evaluates every wire in a circuit design to determine if the total circuit can function in the presence of noise on the wires, the output to the user on a display may, in some exemplary embodiments, show the general noise that is seen on each net and if the noise can possibly upset the intended function of the circuit. Alternatively, the user may be shown only those nets which are seen as possible cause of circuit failure, filtering the others. The intent is to show the user what nets need additional design to prevent problematic noise from occurring. These nets may show propagated noise amplitudes, with the associated arc that was chosen as the path of worst noise through the circuit.

The methods and systems described herein provide a method to perform gate level noise pulse propagation for an arbitrary input noise pulse and output load using ViVo tables from a CCS-Noise rule with high accuracy, which greatly reduces processing intensive costly simulations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predicting noise propagation in a circuit, the method comprising:
   correlating, using a processor, noise results predicted by a circuit model to a transistor level model with a processor;
   generating, using the processor, a first best fit data analytics model for identifying an optimal output pin capacitance as a function of circuit conditions and storing the first best fit model in a noise rule file in a memory;
   generating, using the processor, a second best fit data analytics model for predicting noise peak output from the circuit model as a function of the circuit conditions and storing the second best fit model in the noise rule file in the memory; and
   applying the first best fit model and the second best fit model in a noise analysis simulation to reduce a number simulations performed by the processor to identify and simulate an optimal circuit,
   wherein the applying the first best fit model and the second best fit model in a noise analysis simulation to identify and simulate the optimal circuit includes:
   identifying with the processor a driving cell in the circuit and a load on the driving cell undergoing the noise analysis;
   identifying all upstream noise for all inputs to the driving cell;
   with input noise characteristics and instance specific output load, calculating an optimal cell intrinsic output capacitance for each driver cell input/output arc;

with the input noise characteristics and the instance specific output load, estimating a propagated noise peak for each arc and each when condition;
identifying a worst case when condition for each arc and identifying a worst case arc among each arc;
outputting the identified worst case arc to a user on a display; and
performing an entire propagated noise pulse waveform shape simulation on the worst case arc while excluding each remaining arc.

2. The method of claim 1, wherein the correlating noise results predicted by a circuit model to a transistor level model with a processor includes:
receiving a pulse configuration in the processor;
setting a best fit pin to capacitance value to a SPICE pin cap value;
running a simulation of the circuit model;
determine whether a pulse generated in the simulation of the circuit model matches a corresponding SPICE pulse; and
saving a best fit pin capacitance in the memory responsive to determining that the pulse generated in the simulation of the circuit model matches the corresponding SPICE pulse.

3. The method of claim 2, further comprising adjusting the best fit pin capacitance value responsive to determining that the pulse generated in the simulation of the circuit model does not match the corresponding SPICE pulse.

4. The method of claim 1, wherein the determining whether a pulse generated in the simulation of the circuit model matches a corresponding SPICE pulse includes determining whether an output voltage peak is within a minimum voltage tolerance of a target voltage and whether the output capacitance is within a minimum pin capacitance tolerance.

5. The method of claim 1, wherein the determining whether a pulse generated in the simulation of the circuit model matches a corresponding SPICE pulse includes determining whether a maximum number of simulation iterations has been executed.

6. The method of claim 1, further comprising simulating the circuit using the identified worse case arc and an identified output pin capacitance value.

7. A system comprising:
a memory; and
a processor communicatively connected to the memory, the processor operative to:
correlate noise results predicted by a circuit model to a transistor level model with a processor;
generate a first best fit data analytics model for identifying an optimal output pin capacitance as a function of circuit conditions and store the first best fit model in a noise rule file in a memory;
generate a second best fit data analytics model for predicting noise peak output from the circuit model as a function of the circuit conditions and store the second best fit model in the noise rule file in the memory; and
apply the first best fit model and the second best fit model in a noise analysis simulation to reduce a number simulations performed by the processor to identify and simulate an optimal circuit,
wherein the applying the first best fit model and the second best fit model in a noise analysis simulation to identify and simulate the optimal circuit includes:
identifying with the processor a driving cell in the circuit and a load on the driving cell undergoing the noise analysis;
identifying all upstream noise for all inputs to the driving cell;
with input noise characteristics and instance specific output load, calculating an optimal cell intrinsic output capacitance for each driver cell input/output arc;
with the input noise characteristics and the instance specific output load, estimating a propagated noise peak for each arc and each when condition;
identifying a worst case when condition for each arc and identifying a worst case arc among each arc;
outputting the identified worst case arc to a user on a display; and
performing an entire propagated noise pulse waveform shape simulation on the worst case arc while excluding each remaining arc.

8. The system of claim 7, wherein the correlating noise results predicted by a circuit model to a transistor level model with a processor includes:
receiving a pulse configuration in the processor;
setting a best fit pin to capacitance value to a SPICE pin cap value;
running a simulation of the circuit model;
determine whether a pulse generated in the simulation of the circuit model matches a corresponding SPICE pulse; and
saving a best fit pin capacitance in the memory responsive to determining that the pulse generated in the simulation of the circuit model matches the corresponding SPICE pulse.

9. The system of claim 8, wherein the processor is further operative to adjust the best fit pin capacitance value responsive to determining that the pulse generated in the simulation of the circuit model does not match the corresponding SPICE pulse.

10. The system of claim 7, wherein the determining whether a pulse generated in the simulation of the circuit model matches a corresponding SPICE pulse includes determining whether an output voltage peak is within a minimum voltage tolerance of a target voltage and whether the output capacitance is within a minimum pin capacitance tolerance.

11. The system of claim 7, wherein the determining whether a pulse generated in the simulation of the circuit model matches a corresponding SPICE pulse includes determining whether a maximum number of simulation iterations has been executed.

12. The system of claim 7, wherein the processor is further operative to simulate the circuit using the identified worse case arc and an identified output pin capacitance value.

13. A computer program product comprising a non-transitory computer readable storage medium having program instructions embodied therewith, the program instructions executable by a processor to cause the processor to perform a method comprising:
correlating noise results predicted by a circuit model to a transistor level model with a processor;
generating a first best fit data analytics model for identifying an optimal output pin capacitance as a function of circuit conditions and store the first best fit model in a noise rule file in a memory;
generating a second best fit data analytics model for predicting noise peak output from the circuit model as a function of the circuit conditions and store the second best fit model in the noise rule file in the memory; and
applying the first best fit model and the second best fit model in a noise analysis simulation to reduce a number simulations performed by the processor to identify and simulate an optimal circuit,
wherein the applying the first best fit model and the second best fit model in a noise analysis simulation to identify and simulate the optimal circuit includes:
identifying with the processor a driving cell in the circuit and a load on the driving cell undergoing the noise analysis;
identifying all upstream noise for all inputs to the driving cell;
with input noise characteristics and instance specific output load, calculating an optimal cell intrinsic output capacitance for each driver cell input/output arc;
with the input noise characteristics and the instance specific output load, estimating a propagated noise peak for each arc and each when condition;
identifying a worst case when condition for each arc and identifying a worst case arc among each arc;
outputting the identified worst case arc to a user on a display; and
performing an entire propagated noise pulse waveform shape simulation on the worst case arc while excluding each remaining arc.

14. The computer program product of claim 13, wherein the correlating noise results predicted by a circuit model to a transistor level model with a processor includes:
receiving a pulse configuration in the processor;
setting a best fit pin to capacitance value to a SPICE pin cap value;
running a simulation of the circuit model;
determine whether a pulse generated in the simulation of the circuit model matches a corresponding SPICE pulse; and
saving a best fit pin capacitance in the memory responsive to determining that the pulse generated in the simulation of the circuit model matches the corresponding SPICE pulse.

15. The computer program product of claim 14, wherein the method further comprises adjusting the best fit pin capacitance value responsive to determining that the pulse generated in the simulation of the circuit model does not match the corresponding SPICE pulse.

16. The computer program product of claim 13, wherein the determining whether a pulse generated in the simulation of the circuit model matches a corresponding SPICE pulse includes determining whether an output voltage peak is within a minimum voltage tolerance of a target voltage and whether the output capacitance is within a minimum pin capacitance tolerance.

17. The computer program product of claim 13, wherein the determining whether a pulse generated in the simulation of the circuit model matches a corresponding SPICE pulse includes determining whether a maximum number of simulation iterations has been executed.

* * * * *